(12) United States Patent
van Duijn et al.

(10) Patent No.: US 12,704,107 B2
(45) Date of Patent: Aug. 11, 2026

(54) ENERGY TRANSFER FROM A DRUM TO A DISPLACEMENT ELEMENT

(71) Applicant: Honeywell International Inc., Charlotte, NC (US)

(72) Inventors: Dirk van Duijn, Katwijk (NL); Frank Edo Bakker, Edam (NL); Ronald Schrier, Delft (NL)

(73) Assignee: Honeywell International Inc.

( * ) Notice: Subject to any disclaimer, the term of this patent is extended or adjusted under 35 U.S.C. 154(b) by 453 days.

(21) Appl. No.: 18/141,792

(22) Filed: May 1, 2023

(65) Prior Publication Data

US 2024/0369035 A1 Nov. 7, 2024

(51) Int. Cl.

| | |
|---|---|
| ***F03B 17/02*** | (2006.01) |
| ***G01F 23/00*** | (2022.01) |
| ***G01F 23/20*** | (2006.01) |
| *G01F 25/20* | (2022.01) |

(52) U.S. Cl.

CPC ........ *F03B 17/025* (2013.01); *G01F 23/0023* (2013.01); *G01F 23/205* (2013.01); *G01F 25/20* (2022.01)

(58) Field of Classification Search

CPC .... F03B 17/25; G01F 23/0023; G01F 23/205; G01F 25/20; G01F 23/0038; G01F 23/20

See application file for complete search history.

(56) References Cited

U.S. PATENT DOCUMENTS 3,017,771 A * 1/1962 Francois ............... G01F 23/245 73/290 R
8,997,549 B2 4/2015 Joosten et al.
10,564,023 B2 2/2020 Schrier et al.
2014/0016126 A1 1/2014 Versluijs et al.
2017/0097253 A1* 4/2017 Van Bekkum ...... G01F 23/0023
2023/0057613 A1 2/2023 Endean

FOREIGN PATENT DOCUMENTS

EP 0097385 A1 * 1/1984 ............. G01N 11/10
EP 3359926 B1 12/2020

OTHER PUBLICATIONS

"Enraf Servo 954," Honeywell Process Solutions, https://process.honeywell.com/us/en/products/terminals/enraf-tank-gauging/enraf-servo-954, downloaded Mar. 10, 2023.
"Service Manual, 954 SmartServo FlexLine," Honeywell, 2019.
"Enraf Smart Servo 954, Industry's Best Servo Gauge Is Now Even Better," Honeywell International 2019, 190-954-401 | Jun. 2019 Rev.

* cited by examiner

*Primary Examiner* — David Z Huang

(74) *Attorney, Agent, or Firm* — Ingrassia, Fisher and Lorenz

(57) ABSTRACT

An energy transfer apparatus can include an electromechanical gauge having a motor and a displacer connected to the electromechanical gauge by a wire, wherein energy is transferred from the motor of the electromechanical gauge to the displacer using the motor and the wire combined with mechanical drag. A spring may be located between the wire and a mass inside the displacer, wherein a lifting and a lowering of the displacer generates an oscillation of the displacer body, wherein the oscillation is usable to generate the energy. The displacer may include a moving element that can introduce the mechanical drag when the displacer is moved through liquid by the motor. The movement of the moving element can be transferred into mechanical movement or into electricity.

17 Claims, 6 Drawing Sheets

ENERGY TRANSFER FROM A DRUM TO A DISPLACEMENT ELEMENT

TECHNICAL FIELD

Embodiments are generally related to electromechanical gauges and in particular, electromechanical liquid level gauges that use the servo principle. Embodiments also relate to devices, systems, and method for transfer of energy.

BACKGROUND

Electromechanical liquid level servo gauges (ESGs) are used for the accurate measurement of product level and the water interface level in bulk storage tanks used for typical hydrocarbons (often referred to as fuel and oil) as well as for a variety of other liquid chemicals. These products range from very light chemicals, including so-called LPG's (mixtures of propane and butane or even liquefied natural gas (LNG)) to all types of refined products such as naphtha, gasoline, diesel, jet fuels, lubricants and all types of chemicals, both pure and mixed.

The servo principle is based on the measurement of the apparent weight of a displacer that is within the liquid in the tank. The displacer is a mechanical body suspended on a strong thin measuring wire, where the displacer has a higher density than the liquid to be measured. The measurement wire is wound on a high accuracy machined grooved drum with a calibrated circumference that is coupled to a detection shaft that is coupled to a worm wheel (or servo motor) by ball bearings. The apparent weight resulting from the weight of the displacer minus the weight of the displaced liquid product is measured and is then used by a computing device such as a microcontroller with the servo motor used to rotate drum in order to position the displacer at a different height in the tank.

By rotating the drum, the wire can be spooled into the tank and the displacer can be raised or lowered until the measured apparent weight equals the programmed set point. For safety reasons typically a magnetic coupling (e.g., using pole pairs) may be located between drum and components (e.g., motor, microcontroller, electronics, etc.) as many of the liquids products which are commonly stored in bulk storage tanks are flammable and typically require an explosion-safe design. The displacer being denser as compared to the density of the liquid product in the tank is basically kept at the same level using Archimedes law, which indicates that the upward buoyant force that is exerted on a body immersed in a fluid, whether fully or partially submerged, is equal to the weight of the fluid that the body displaces.

BRIEF SUMMARY

The following summary is provided to facilitate an understanding of some of the features of the disclosed embodiments and is not intended to be a full description. A full appreciation of the various aspects of the embodiments disclosed herein can be gained by taking the specification, claims, drawings, and abstract as a whole.

It is, therefore, one aspect of the embodiments to provide for an energy transfer apparatus and methods of operating the energy transfer apparatus.

It is another aspect of the embodiments to provide for a transfer of energy from a motor in an electromechanical gauge to a displacement element.

It is also an aspect of the embodiments to provide for an energy transfer apparatus that facilitates energy transfer from a drum to a displacement element.

It is a further aspect of the embodiments to provide for an energy transfer apparatus in which the motor of an electromechanical gauge and mechanical drag are used for the transfer of energy.

The aforementioned aspects and other objectives can now be achieved as described herein. In an embodiment, an energy transfer apparatus can include an electromechanical gauge having a motor, and a displacer connected to the electromechanical gauge by a wire, wherein energy is transferred from the motor of the electromechanical gauge to the displacer using the motor and the wire combined with mechanical drag.

In an embodiment, a spring can be located between the wire and a mass inside the displacer, the displacer comprising a displacer body, wherein a lifting and a lowering of the displacer generates an oscillation of the displacer body. The oscillation is usable to generate the energy.

In an embodiment, the spring can be located above the mass to disturb a liquid level measuring function.

In an embodiment, the energy that is generated can be used to drive mechanics.

In an embodiment, the energy that is generated can be used to generate electricity.

In an embodiment, the wire can be attached to a rotatable drum.

In an embodiment, the motor can drive the rotatable drum.

In an embodiment, the displacer can include a moving element that can introduce the mechanical drag when the displacer is moved through a liquid by the motor.

In an embodiment, a movement of the moving element can be transferred into mechanical movement or into electricity.

In an embodiment, the electromechanical gauge can comprise a servo gauge.

BRIEF DESCRIPTION OF THE DRAWINGS

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention.

Identical or similar parts or elements in the figures may be indicated by the same reference numerals.

DETAILED DESCRIPTION

Figure 1:
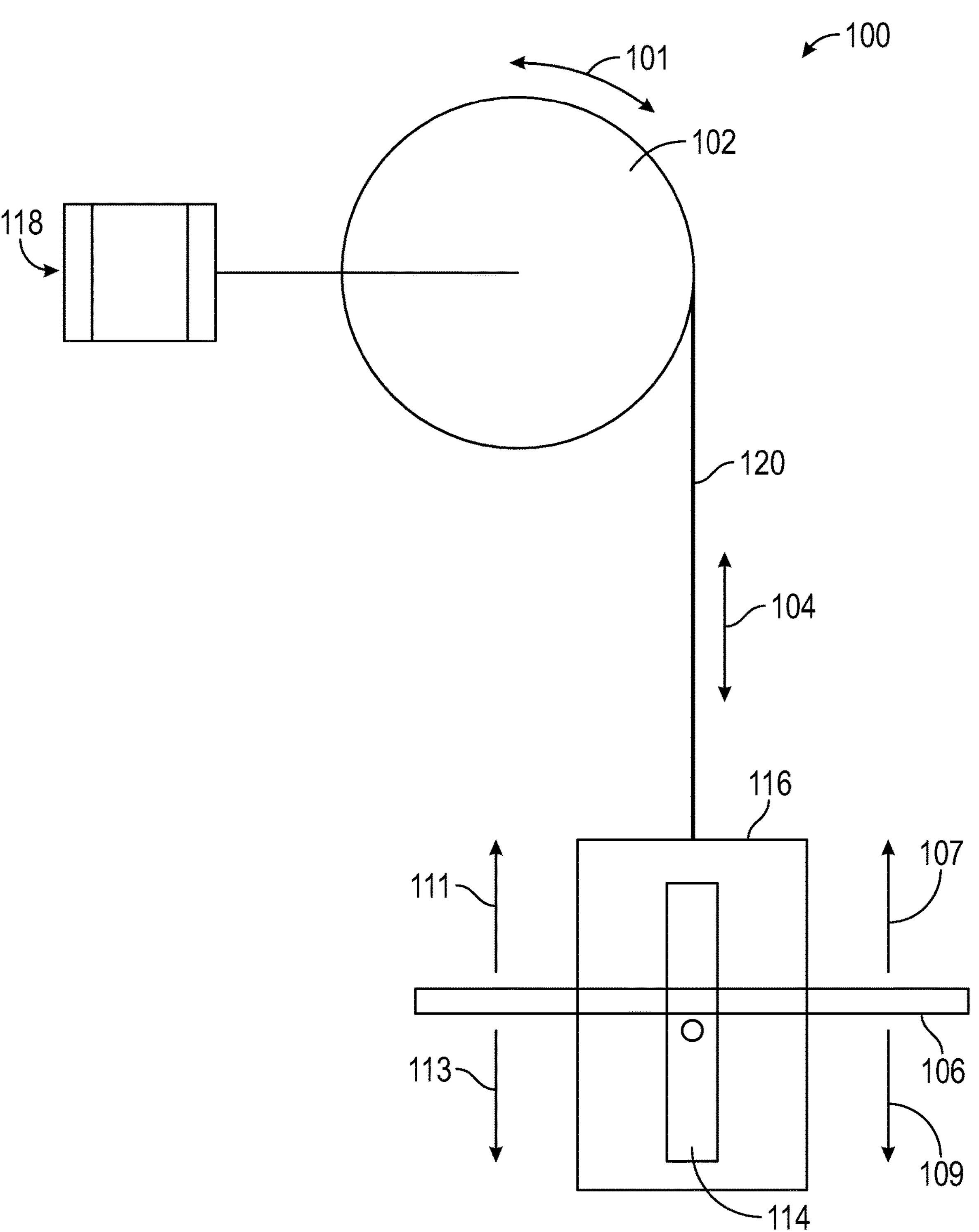
FIG. 1 illustrates a schematic diagram of an energy transfer apparatus having a moveable element that introduces drag when a displacer is moved through liquid by a motor, in accordance with an embodiment.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other issues, subject matter may be embodied as methods, devices, components, or systems. Accordingly, embodiments may, for example, take the form of hardware, software, firmware, or a combination thereof. The following detailed description is, therefore, not intended to be interpreted in a limiting sense.

Throughout the specification and claims, terms may have nuanced meanings suggested or implied in context beyond an explicitly stated meaning. Likewise, phrases such as "in an embodiment" or "in one embodiment" or "in an example embodiment" and variations thereof as utilized herein may or may not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Generally, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. Furthermore, the term "at least one" as used herein, may refer to "one or more." For example, "at least one widget" may refer to "one or more widgets."

In addition, the term "based on" may be understood as not necessarily intended to convey an exclusive set of factors and may, instead, allow for existence of additional factors not necessarily expressly described, again, depending at least in part on context.

As discussed in the background section of this disclosure, displacement type measure devices require sensors in the displacement element. These displacement elements may be suspended in a liquid and can be connected with a very thin metal wire to the gauge only. To power the sensors inside the displacement element we need some form of energy. This can be facilitated by, for example, a mechanical movement or electricity. The latter may be a supplied from a rechargeable battery. The disclosed embodiments can transfer energy from a motor in an electromechanical gauge to the displacement element. The energy can be used to drive either mechanics or be used as a way to generate electricity.

FIG. 1 illustrates a schematic diagram of an energy transfer apparatus 100 having a moveable element 106 that introduces drag when a displacer 116 is moved through liquid by a motor 118, in accordance with an embodiment. The displacer 116 includes a displacer element 114 connected to the moveable element 106. A motor 118 can drive a drum 102 that is rotatable as indicated by the curved double arrow 101 shown in FIG. 1. A wire 120 can be connected to the drum 102 and extends in a vertical direction. The wire 120 can be attached to the displacer 116, which hangs from the wire 120. Arrows 107 and 109 indicate movement up or down in a vertical direction. The double arrow 104 also indicates movement up or down in the vertical direction. Furthermore, arrows 111 and 113 represent vertical movement by the moveable element 106.

Figure 3:
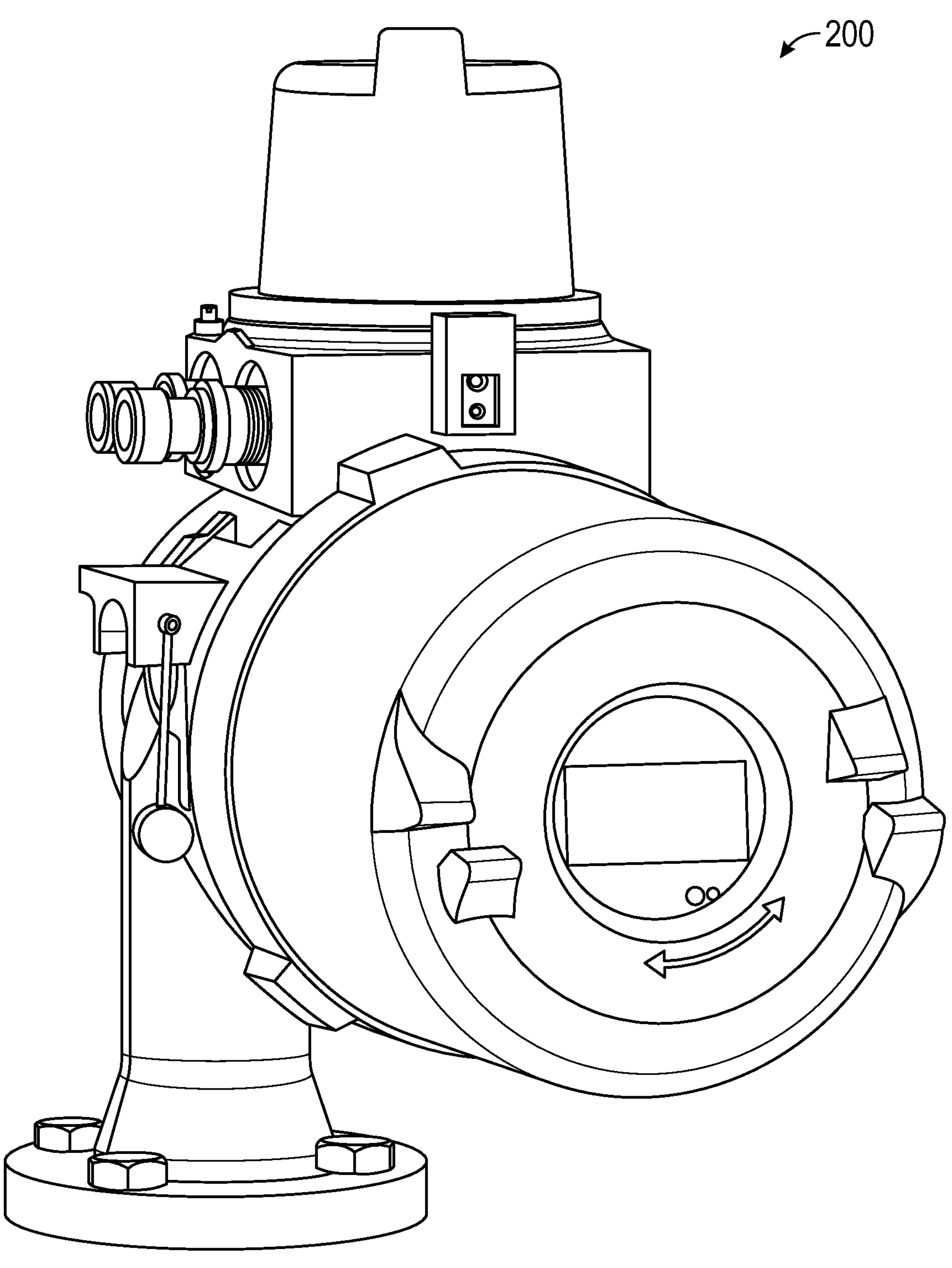
FIG. 3 illustrates a schematic diagram of an electromechanical gauge, which can be adapted or use in accordance one or more embodiments.

The motor 118 can be a motor of an electromechanical gauge such as the electromechanical gauge 103 shown in FIG. 3. The displacer 116 can be connected to such an electromechanical gauge by the wire 120. Energy can be transferred from the motor 118 of the electromechanical gauge to the displacer 116 using the motor 118 combined with mechanical drag facilitated by the moveable element 106. An example of an electromechanical gauge is an electromechanical liquid level servo gauge (ESG), or simply 'servo gauge'.

The displacer 116 can be equipped with the moveable element 106 which can function as a "large moving element" that can introduce drag when the displacer 116 is moved through the liquid by the motor 118. The movement of this element 106 can be transferred into a needed mechanical movement or into electricity.

Figure 2:
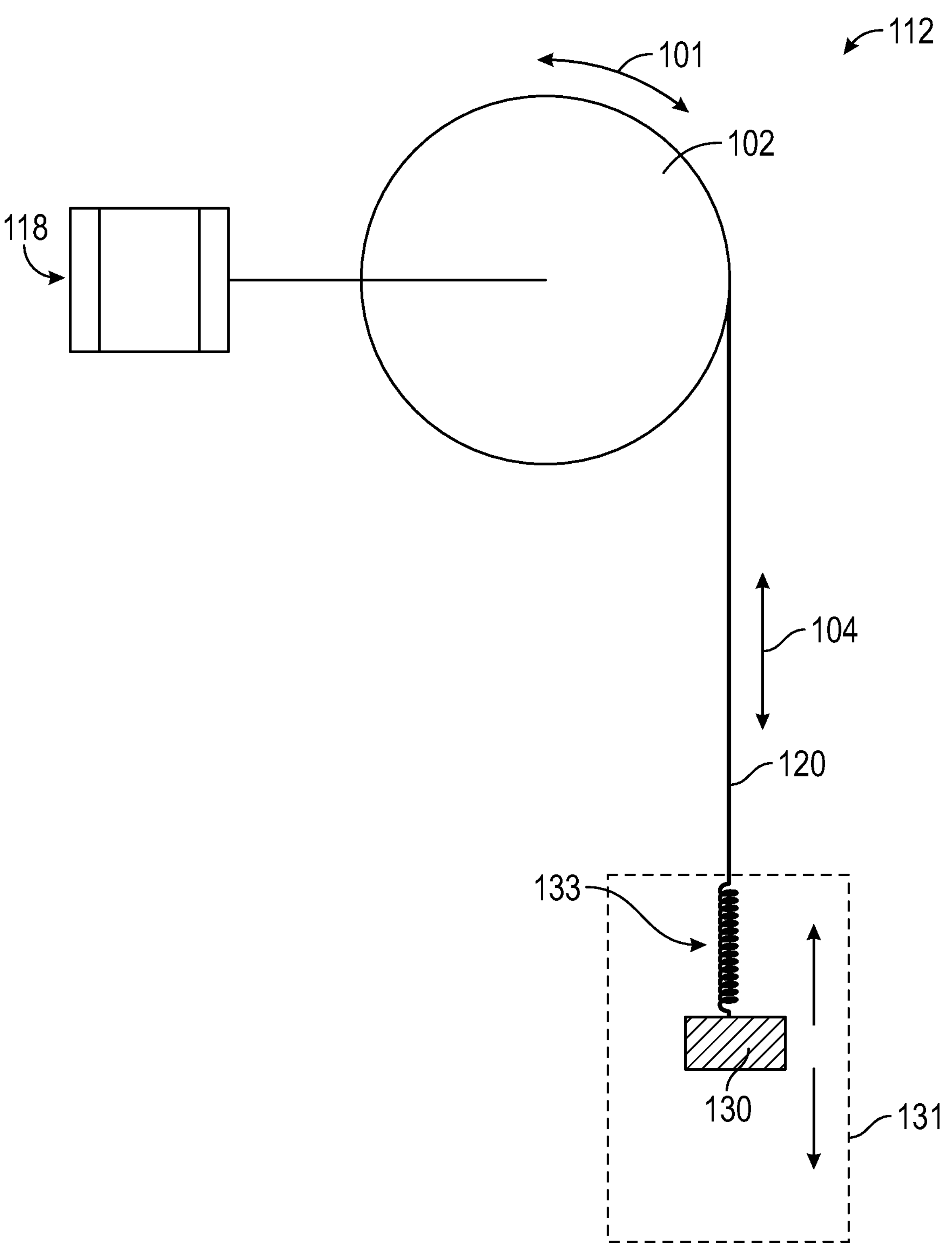
FIG. 2 illustrates a schematic diagram of an energy transfer apparatus having a spring between a wire and a displacer, in accordance with another embodiment.

FIG. 2 illustrates a schematic diagram of an energy transfer apparatus 112 having a spring 133 positioned between the wire 120 and a mass 130, in accordance with another embodiment. A displacer 131 indicated by the dashed line in FIG. 2 can include the mass 130 and the spring 133. In some embodiments, the displacer 131 can include a displacer body. Lifting and lowering of the displacer 131 can quickly generate an oscillation of the displacer body (i.e., the body of the displacer 131) that can be used to generate energy. Note that in FIG. 2, the dotted line indicative of the displacer 131 represents the actual displacer used for level gauging based on buoyancy. The mass 130 is contained inside the displacer 131 and can be made to move (e.g., shake) so that energy can be harvested from the mass 130.

FIG. 3 illustrates a schematic diagram of an electromechanical gauge 200, which can be adapted or use in accordance one or more embodiments. An example of the electromechanical gauge 200 is a servo gauge. There are a number of different types of servo gauges, which may be implemented in accordance with varying aspects of the embodiments. One non-limiting example of a servo gauge, which may be adapted for use with an embodiment is the SmartServo FlexLine 954 gauge from Honeywell International Inc. The electromechanical gauge 200 may be implemented as, for example, an electromechanical servo gauge (ESG). In the examples discussed below the electromechanical gauge 200 may also be referred to as ESG 200.

Figure 4:
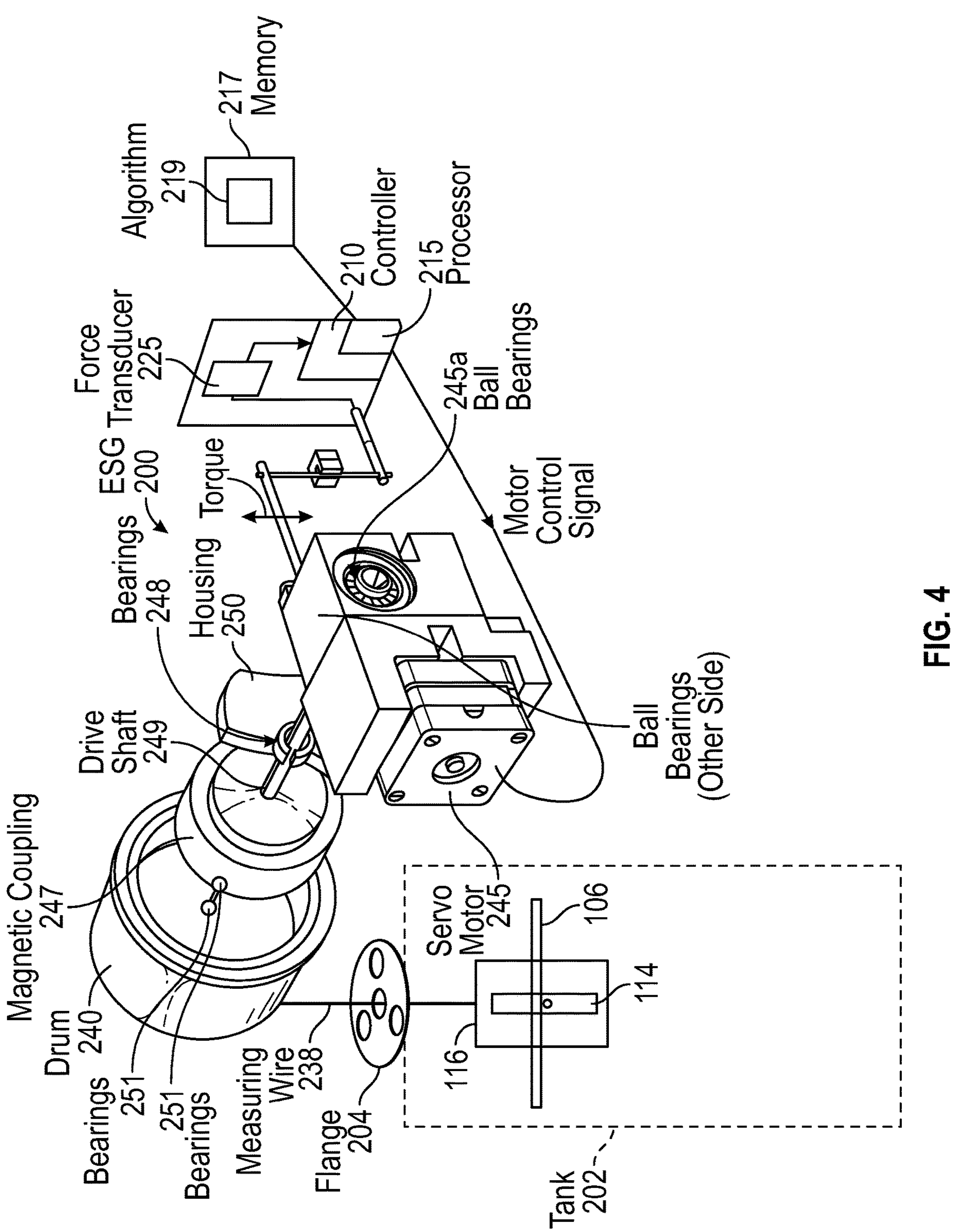
FIG. 4 illustrates a schematic diagram of an example electromechanical servo gauge (ESG), which can be implemented in accordance with an embodiment.

FIG. 4 illustrates a schematic diagram of an example electromechanical servo gauge (ESG) 200, which can be implemented in accordance with an embodiment. The ESG 200 can include a controller 210 comprising a processor 215 having an associated memory 217 storing an algorithm 219 that provides steps/operations/instructions for implementing methods for operating an energy transfer apparatus such as the energy transfer apparatuses 100 and 112 discussed previously. The processor 215 can comprise a microprocessor, microcontroller, field programmable gate array, digital signal processor, or other processing or control device.

Figure 5:
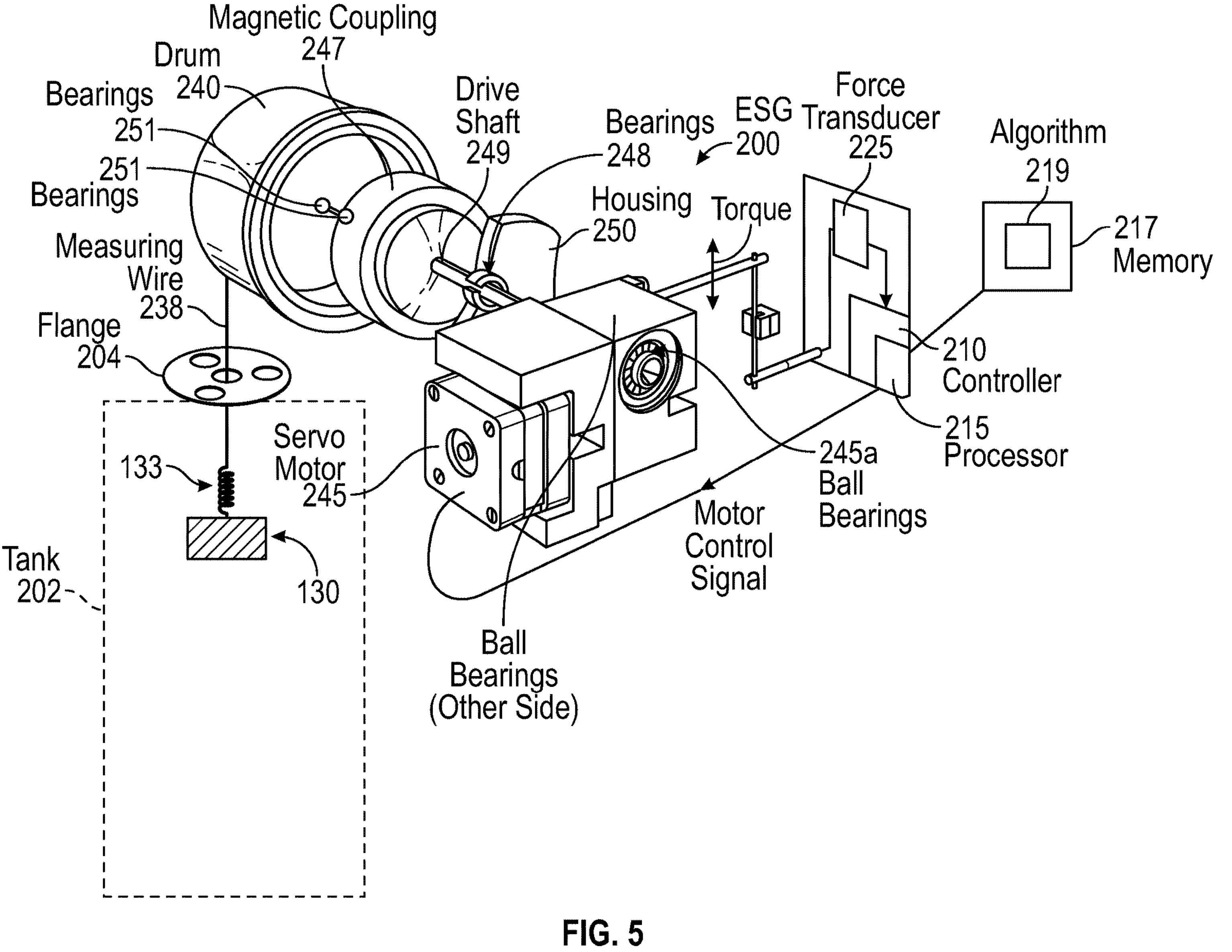
FIG. 5 illustrates a schematic diagram of another example electromechanical servo gauge (ESG), which can be implemented in accordance with another embodiment.

A force transducer 225 is shown on a common PCB board with the processor 215. The force transducer 225 can convert a torque on the drum 240 into a physical quantity such as a frequency, voltage or current, that can be coupled to an input of the controller 210 acting as a Servo Processor Unit (SPU) which can render a torque measurement. Note that the drum 240 is similar or analogous to the drum 102 shown in FIG. 1 and FIG. 2. Furthermore, the measuring wire 238 shown in FIG. 5 is similar to the wire 120, which is also depicted in FIG. 1 and FIG. 2.

ESG 200 can include a displacer 116 within a tank 202 that has a flange 204. Note that the term "tank" as utilized herein can relate to any suitable structure for receiving and storing at least one liquid or other material (e.g., a powder). The tank 202 can, for example, represent an oil storage tank or a tank for storing other liquid(s) or other material(s). The tank 202 can also have any suitable shape and size. Further, the tank 202 can form part of a larger structure. The larger structure can represent any fixed or movable structure containing or associated with one or more tanks, such as a movable tanker vessel, railcar, or truck or a fixed tank farm.

The previously disclosed displacer 116 together with the displacer element 114 connected to the moveable element 106 can be suspended on a measuring wire 238 from a drum 240 that extends through the flange 204 for causing a torque on the drum 240. Note that the entire displacer unit including the displacer element 114 and the moveable element 106 may be referred to as the 'displacer' and in particular as displacer 116 in FIG. 4. The configuration shown in FIG. 4 can thus implement the energy transfer apparatus 100 shown in FIG. 1.

The displacer shape and displacer dimensions may vary depending on a particular implementation and design considerations. A servo motor with a 245 having associated ball bearings 245 can be coupled by a drive shaft 249 to rotate the drum 240 to balance a weight of the displacer 116 in the tank 202 having a liquid therein (not shown). Other bearings 248 are shown between the drive shaft 249 and the housing 250. There are also bearings 251 (e.g., comprising Polytetrafluoroethylene (PTFE)) at the drum's 240 shaft. These bearings 251 carry the drum 240 with outer magnets, which is in another compartment than the motor and electronics. The ball bearings 245 and bearing 248 carry the drive shaft with inner magnets and are located in the motor and electronics compartment and can be positioned between the drive shaft and housing.

An equilibrium condition can exist when the displacer 116 is at a top surface of the liquid, wherein a change in the liquid level causes a change in a counterforce to move the ESG 200 out of balance. As noted above, although not shown, any force which acts via the measuring wire 238 on the drum 240 sensed by force transducer 225 can be transferred as a torque to processor side of the ESG 200 using a magnetic coupling 247.

FIG. 5 illustrates a schematic diagram of another example electromechanical servo gauge (ESG) 200, which can be implemented in accordance with another embodiment. Note that in FIG. 4 and FIG. 5, similar parts or elements are generally indicated by identical reference numerals. In the configuration shown in FIG. 5, however, the spring 133 and the displacer 130 are shown suspended from the wire 238. The configuration shown in FIG. 5 can be used to implement the energy transfer apparatus 112 shown in FIG. 2.

Figure 6:
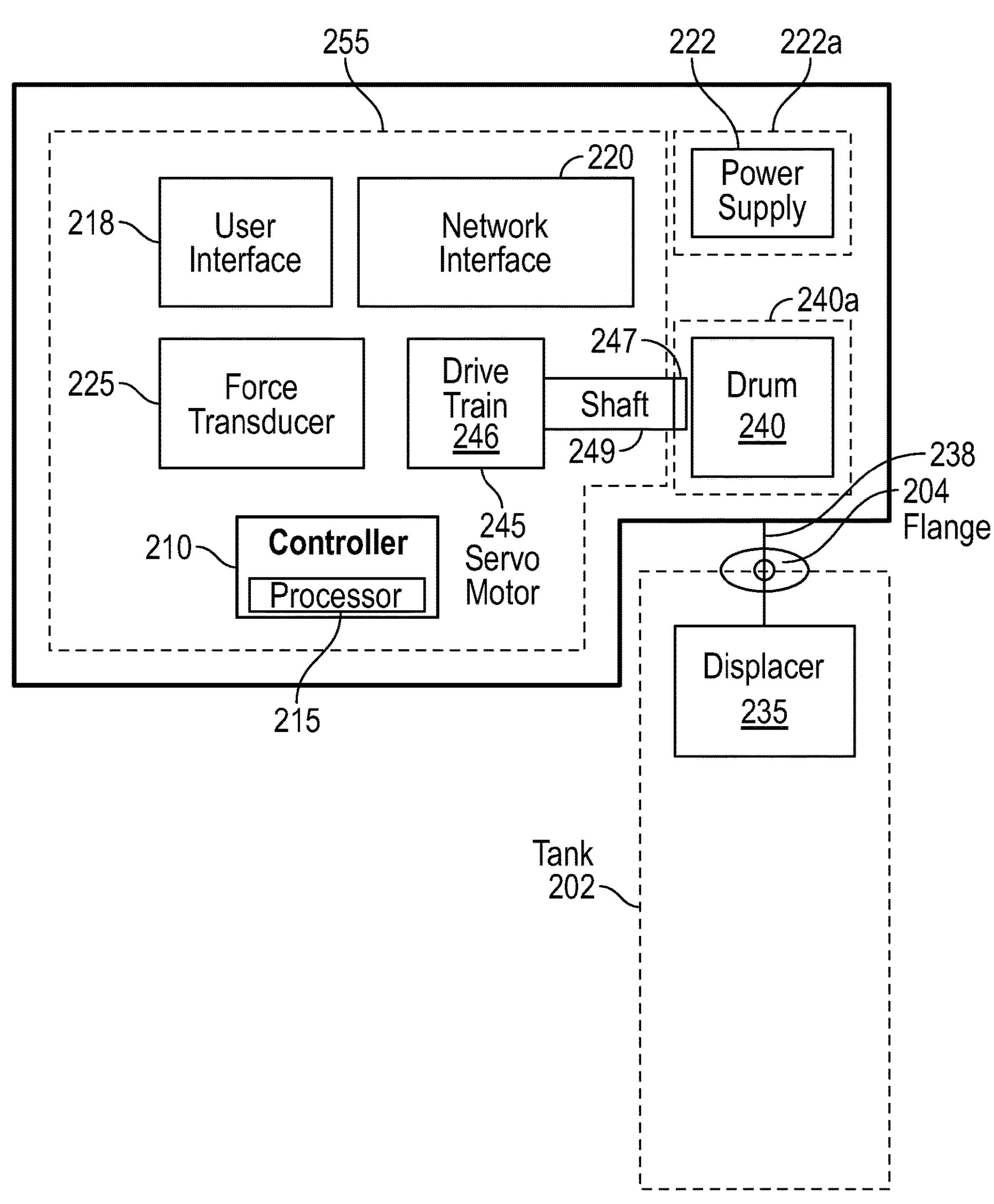
FIG. 6 illustrates a block diagram of an example ESG in accordance with an example embodiment.

FIG. 6 illustrates a block diagram of an example ESG in accordance with an example embodiment. As shown in FIG. 6, the ESG 200 can included three compartments, a drum compartment 240 *a*, a drive compartment 255, and a power supply compartment 222. Note that in FIG. 6, the displacer 235 can represent the previously discussed displacer 116 or displacer 130 (including the spring 133 associated with the displacer 130).

The drum compartment 240 includes the drum 240 on which a wire 238 is wound. The drum 240 can be rotated in one direction by the drive compartment 255 to lower the displacer 235, and the drum 240 can be rotated in another direction by the drive compartment 255 to raise the displacer 235. The drum 240 includes any suitable structure for raising and lowering the displacer 235 via rotation.

The drive compartment 255 can include a motor 245 that includes a drive train 246, which imparts rotation to the drum 240 via a drive shaft 249. For example, the drive train 246 or drive shaft 249 can generate a magnetic field, and a magnetic coupling 247 can be used to convey torque between the drive shaft 249 and the drum 240. In these embodiments, no direct connection may be needed between the drum compartment 240 and the other compartments 255, 222. However, other techniques for causing rotation of the drum 240 can be used, such as when the drive shaft 249 is physically connected to the drum 240. The drive train 246 can include any suitable structure for imparting rotation to the drum 240.

In some embodiments, the drive train 246 can comprise a stepper motor that causes the drum 240 to rotate in specified steps, meaning the drum 240 does not rotate freely but instead in defined amounts or "steps." Each step of the servo motor 245 should therefore impart a known amount of rotation to the drum 240. In these embodiments, since the drum 240 has a known diameter or circumference, the length of the wire 238 that is dispensed or collected during a single step rotation can be known with a high degree of certainty.

The drive compartment 255 also can include a force transducer 225, which can identify the torque induced on the drum 240 by the weight of displacer 235. When the displacer 235 is dangling from the wire 238, the measured torque is higher. When the displacer 235 is completely or partially submerged in the material in the tank, the measured torque is lower. The force transducer 225 generally identifies the torque on the drum 240 by measuring the torque on the shaft 249.

ESG 200 is shown including a user interface 218 and a network interface 220 in the drive compartment 255. The user interface 218 can facilitate communications between the ESG 200 and an operator or other plant personnel. The user interface 218 can provide data from an operator to the controller 210, such as a command to initiate level measurements, a command to raise or lower the displacer 235, or a command to enable or disable testing of the ESG 200. The user interface 218 can also allow the personnel to review measurement data generated by the ESG 200. The user interface 218 may include any suitable interface for interacting with one or more users, such as a keypad or keyboard and a display.

The network interface 220 cam facilitate the communication of data to or from the ESG 200. For example, the network interface 220 can receive level measurements calculated by ESG 200 and transmit the level measurements to one or more external destinations. The network interface 220 can include any suitable structure supporting wired or wireless communications, such as an Ethernet interface, an RF transceiver, or other wired or wireless interface.

The power supply compartment 222 can include a power supply 222, which provides operating power for the ESG 200. The power supply 222 can provide power to various components of the drive compartment 255. Depending on the implementation, the power supply 222 may or may not supply power to the drum compartment 240 *a*. The power supply 222 can include any suitable power providing structure, such as a battery, fuel cell, or solar cell.

Based on the foregoing, it can be appreciated that a number of embodiments including preferred and alternative embodiments, are disclosed herein. For example, in one embodiment, an energy transfer apparatus, can include an electromechanical gauge having a motor, and a displacer connected to the electromechanical gauge by a wire, wherein energy is transferred from the motor of the electromechanical gauge to the displacer using the motor and the wire combined with mechanical drag.

In an embodiment, a spring may be located between the wire and a mass inside the displacer, the displacer comprising a displacer body, wherein a lifting and/or a lowering of the displacer generates an oscillation of the displacer body, wherein the oscillation is usable to generate the energy.

In an embodiment, the spring can be above the mass, which disturbs a liquid level measuring function.

In an embodiment, the energy that is generated can be used to drive mechanics.

In an embodiment, the energy that is generated can be used to generate electricity.

In an embodiment, the wire can be attached to a rotatable drum.

In an embodiment, the motor can drive the rotatable drum.

In an embodiment, the displacer can include a moving element that can introducs the mechanical drag when the displacer is moved through a liquid by the motor.

In an embodiment, a movement of the moving element can be transferred into mechanical movement or into electricity.

In an embodiment, the electromechanical gauge can comprise a servo gauge.

In an embodiment, an energy transfer apparatus can include an electromechanical gauge having a motor; a displacer connected to the electromechanical gauge by a wire, wherein energy is transferred from the motor of the electromechanical gauge to the displacer using the motor and the wire combined with mechanical drag; and a spring located between the wire and a mass inside the displacer, wherein a lifting and a lowering of the displacer generates an oscillation usable to generate the energy.

In an embodiment, an energy transfer apparatus, can include an electromechanical gauge having a motor; and a displacer connected to the electromechanical gauge by a wire, the displacer including a moving element that introduces mechanical drag when the displacer is moved through a liquid by the motor, wherein energy is transferred from the motor of the electromechanical gauge to the displacer using the motor and the wire combined with the mechanical drag.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. An energy transfer apparatus, comprising:

an electromechanical servo gauge having a motor, the electromechanical servo gauge including a drum compartment, a drive compartment, and a power supply; and a displacer connected to the electromechanical servo gauge by a wire, wherein energy is transferred from the motor of the electromechanical servo gauge to the displacer using the motor and the wire combined with mechanical drag, wherein the drum compartment includes a drum on which the wire is wound, the drum rotatable in one direction by the drive compartment to lower the displacer, wherein the drum is rotatable in another direction by the drive compartment to raise the displacer; and a spring located between the wire and a mass inside the displacer, the displacer comprising a displacer body, wherein a lifting and lowering of the displacer generates an oscillation of the displacer body, wherein the oscillation is usable to generate the energy.

2. The energy transfer apparatus of claim 1 wherein the spring located above the mass disturbs a liquid level measuring function.

3. The energy transfer apparatus of claim 1 wherein the energy that is generated is used to drive mechanics.

4. The energy transfer apparatus of claim 1 wherein the energy that is generated is used to generate electricity.

5. The energy transfer apparatus of claim 1 wherein the displacer includes a moving element that introduces the mechanical drag when the displacer is moved through a liquid by the motor.

6. The energy transfer apparatus of claim 5 wherein a movement of the moving element is transferred into mechanical movement or into electricity.

7. The energy transfer apparatus of claim 1 wherein the electromechanical servo gauge comprises a force transducer on a common printed circuit board (PCB) with a processor, wherein the force transducer converts a torque into a physical quantity including at least one of a frequency, a voltage, or a current, wherein the force transducer is coupled to an input of a controller comprising a servo processor unit (SPU) that renders a measurement of torque.

8. An energy transfer apparatus, comprising:

an electromechanical servo gauge having a motor;

a displacer connected to the electromechanical servo gauge by a wire, the displacer having a displacer body and the displacer including a displacer element connected to a moveable element, the wire attached to the displacer, wherein the displacer hangs from the wire, the wire comprising a measuring wire, wherein energy is transferred from the motor of the electromechanical servo gauge to the displacer using the motor and the wire combined with mechanical drag; and a spring located between the wire and a mass inside the displacer, wherein a lifting and a lowering of the displacer body generates an oscillation usable to generate the energy.

9. The energy transfer apparatus of claim 8 wherein the spring located above the mass disturbs a liquid level measuring function.

10. The energy transfer apparatus of claim 8 wherein the energy that is generated is used to drive mechanics.

11. The energy transfer apparatus of claim 8 wherein the energy that is generated is used to generate electricity.

12. The energy transfer apparatus of claim 8 wherein the wire is attached to a rotatable drum.

13. The energy transfer apparatus of claim 12 wherein the motor drives the rotatable drum.

14. An energy transfer apparatus, comprising:

an electromechanical gauge having a motor;

a displacer connected to the electromechanical gauge by a wire, the displacer including a moving element that introduces mechanical drag when the displacer is moved through a liquid by the motor, wherein energy is transferred from the motor of the electromechanical gauge to the displacer using the motor and the wire combined with the mechanical drag; and wherein the motor comprises a servo motor coupled to a drum by a drive shaft supported by ball bearings positioned between the drive shaft and a housing, and wherein the drum is supported at a drum shaft by bearings configured to carry the drum, and wherein the drum includes outer magnets magnetically coupled to inner magnets carried by the drive shaft to transfer torque to a processor side of the electromechanical gauge; and a spring located between the wire and a mass inside the displacer, the displacer comprising a displacer body, wherein a lifting and lowering of the displacer generates an oscillation of the displacer body, wherein the oscillation is usable to generate the energy.

15. The energy transfer apparatus of claim 14 wherein a movement of the moving element is transferred into mechanical movement.

16. The energy transfer apparatus of claim 14 wherein a movement of the moving element is transferred into electricity.

17. The energy transfer apparatus of claim 14 wherein the wire is attached to a rotatable drum and the motor drives the rotatable drum.

* * * * *